Oct. 25, 1949.  F. A. BARNES  2,486,097
CONTROL SYSTEM
Filed March 2, 1944  7 Sheets-Sheet 1
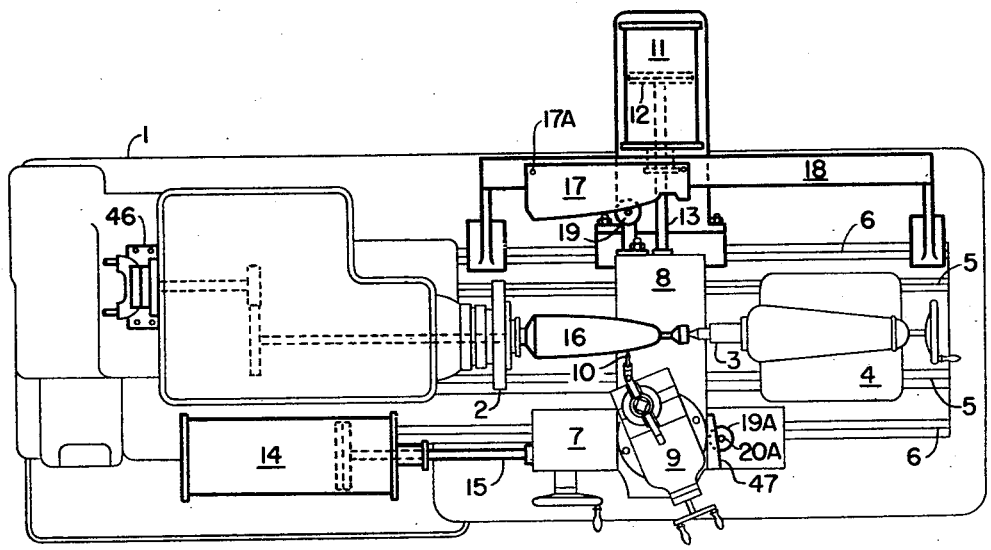
FIG. 1
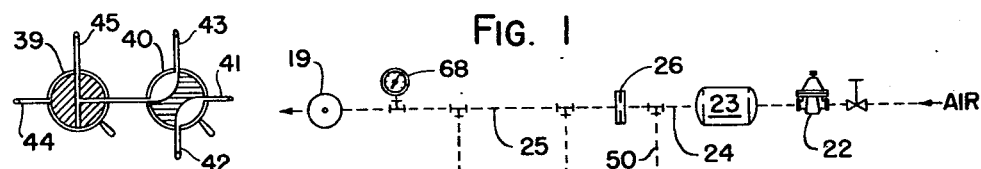
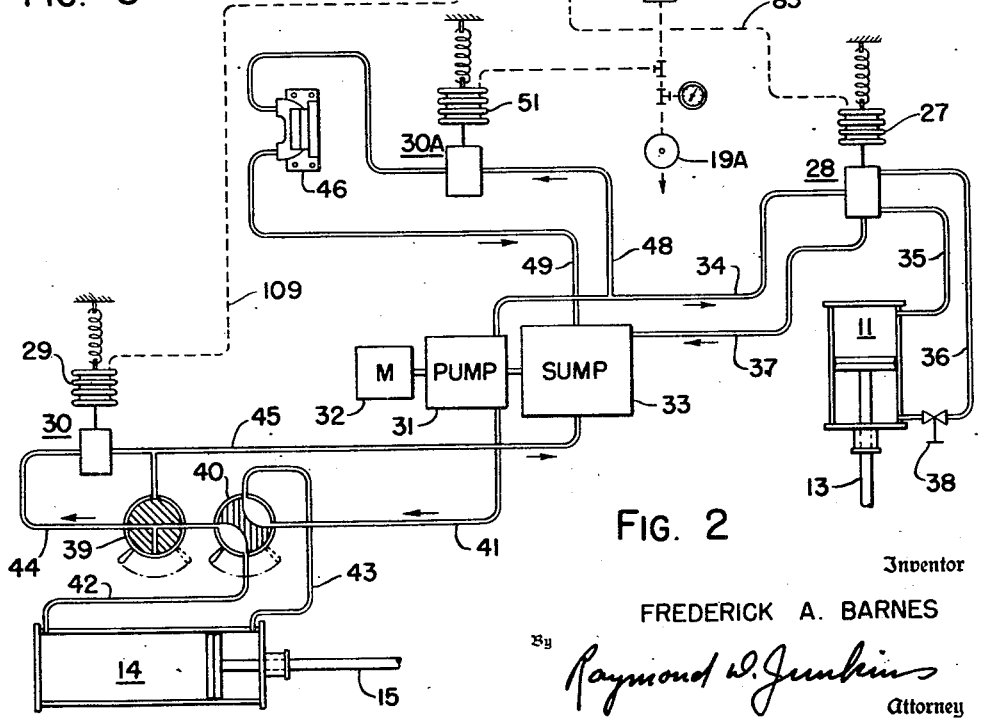
FIG. 3
FIG. 2
Inventor
FREDERICK A. BARNES
By Raymond W. Jenkins
Attorney Oct. 25, 1949.     F. A. BARNES     2,486,097
CONTROL SYSTEM
Filed March 2, 1944     7 Sheets-Sheet 2
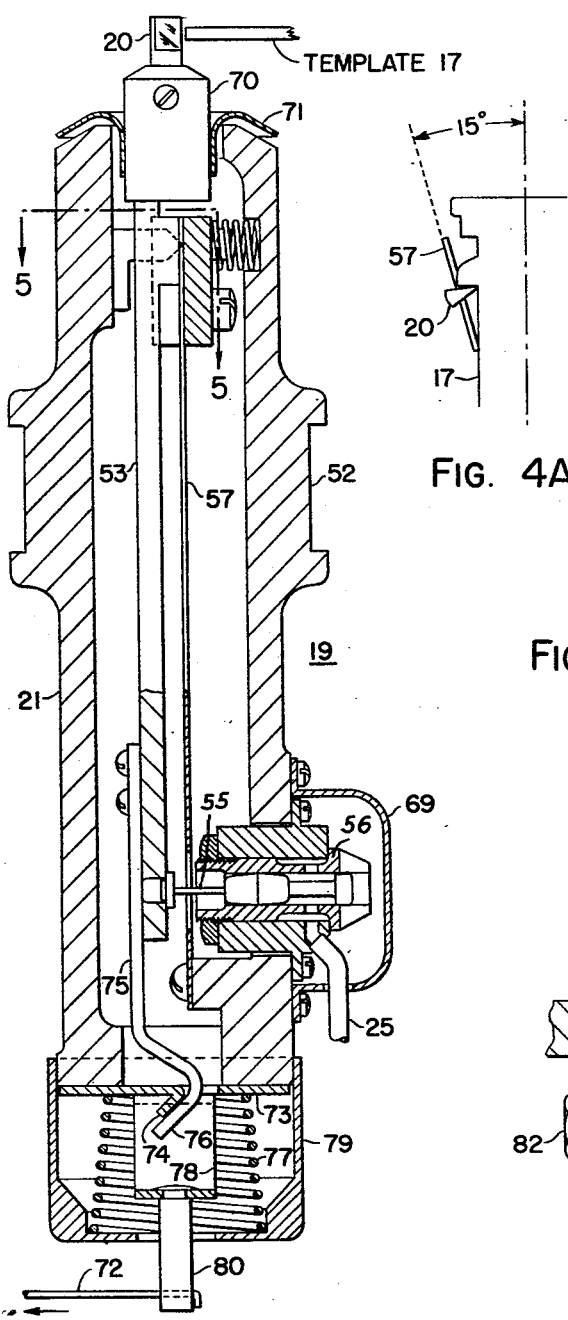
FIG. 4
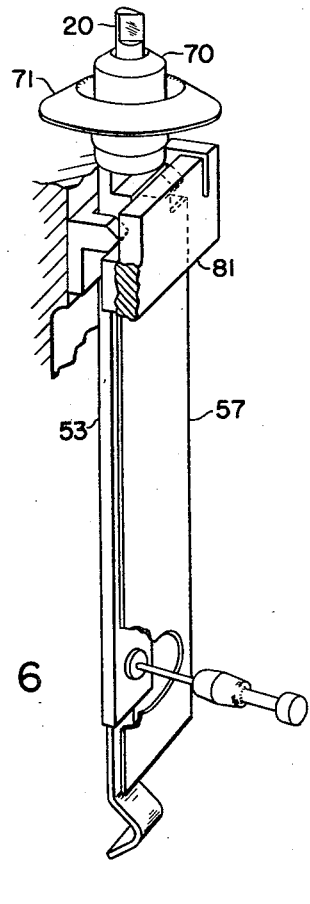
FIG. 4A
FIG. 6
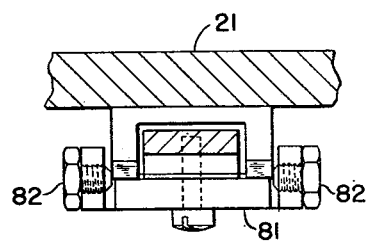
FIG. 5
Inventor
FREDERICK A. BARNES
By Raymond D. Jenkins
Attorney Oct. 25, 1949.  F. A. BARNES  2,486,097
CONTROL SYSTEM
Filed March 2, 1944  7 Sheets-Sheet 3

Inventor
FREDERICK A. BARNES
By Raymond D. Junkins
Attorney

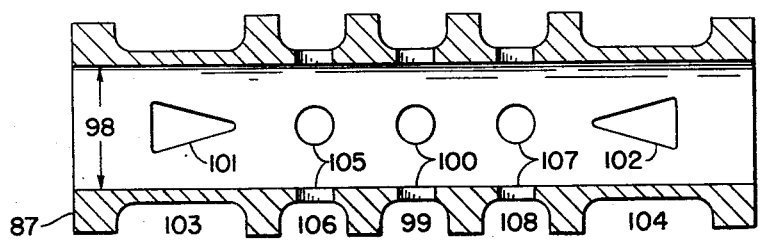
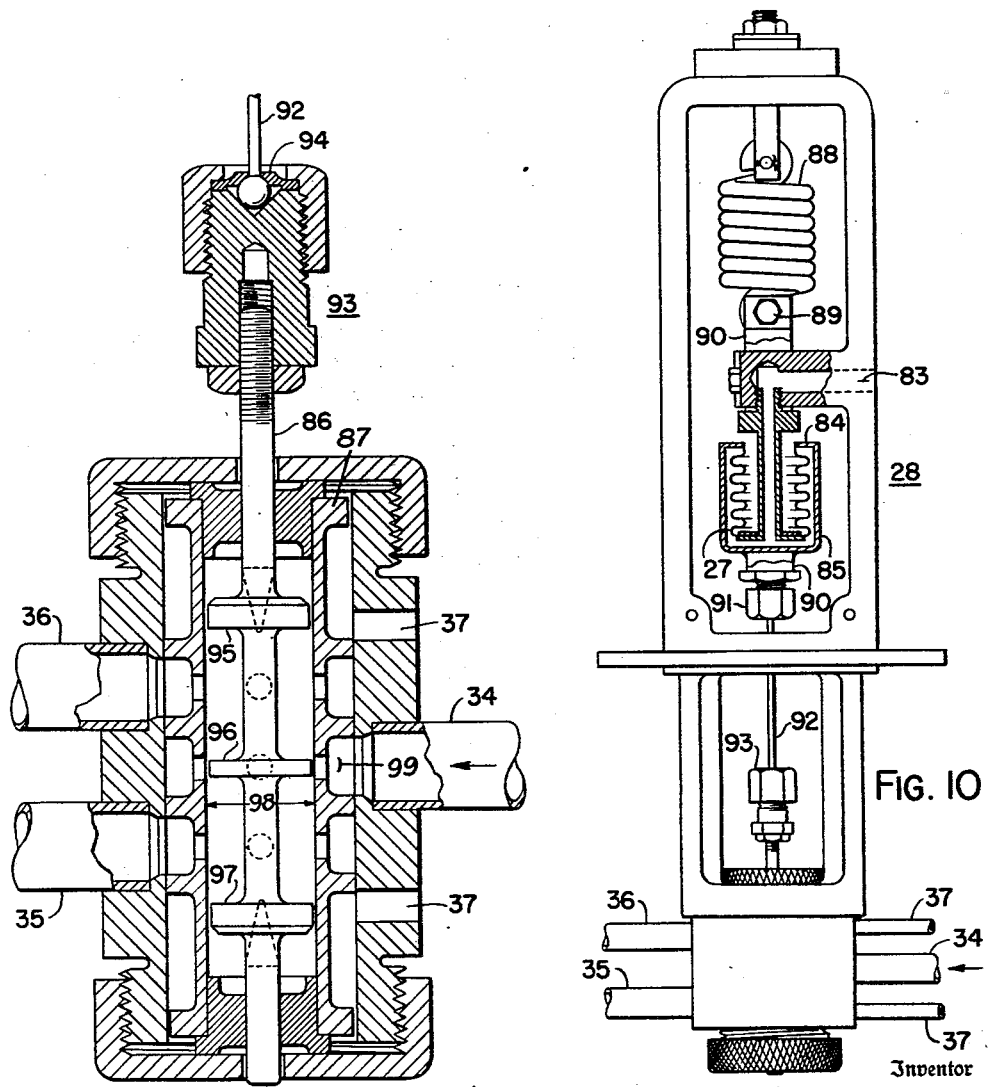
FIG. 12
FIG. 11
FIG. 10
Inventor
FREDERICK A. BARNES
By Raymond W. Jenkins
Attorney

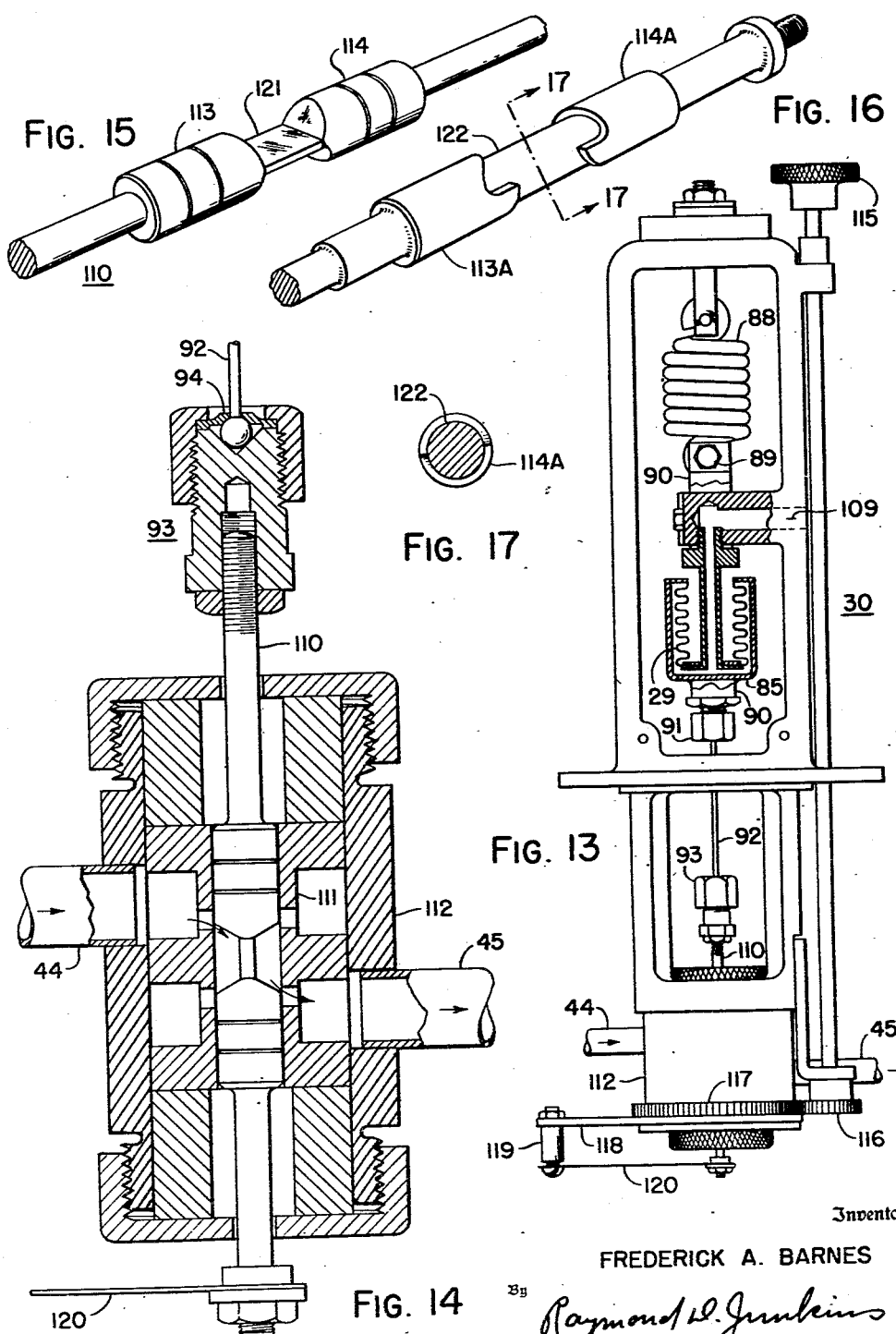
Oct. 25, 1949.   F. A. BARNES   2,486,097
CONTROL SYSTEM
Filed March 2, 1944   7 Sheets-Sheet 5
Inventor
FREDERICK A. BARNES
By Raymond D. Jenkins
Attorney Oct. 25, 1949.　　　F. A. BARNES　　　2,486,097
CONTROL SYSTEM Filed March 2, 1944　　　7 Sheets-Sheet 6

Inventor
FREDERICK A. BARNES
By Raymond W. Junkins
Attorney

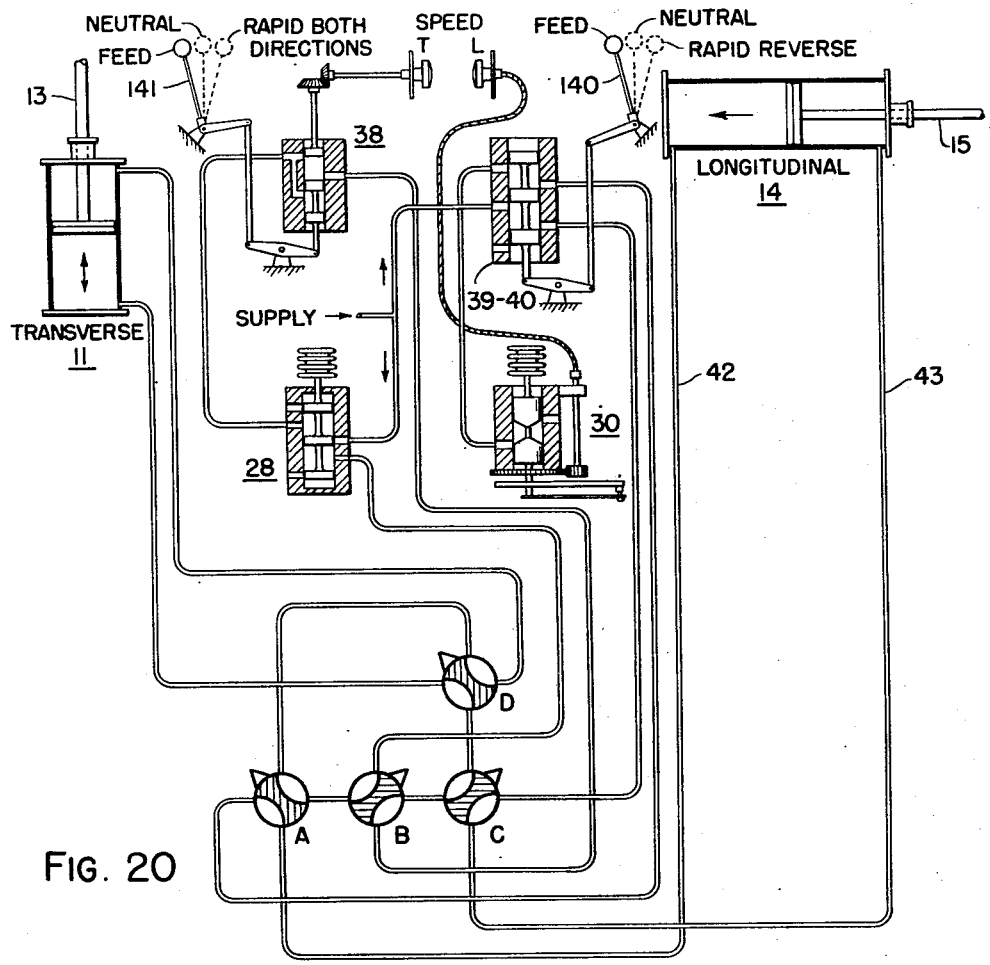
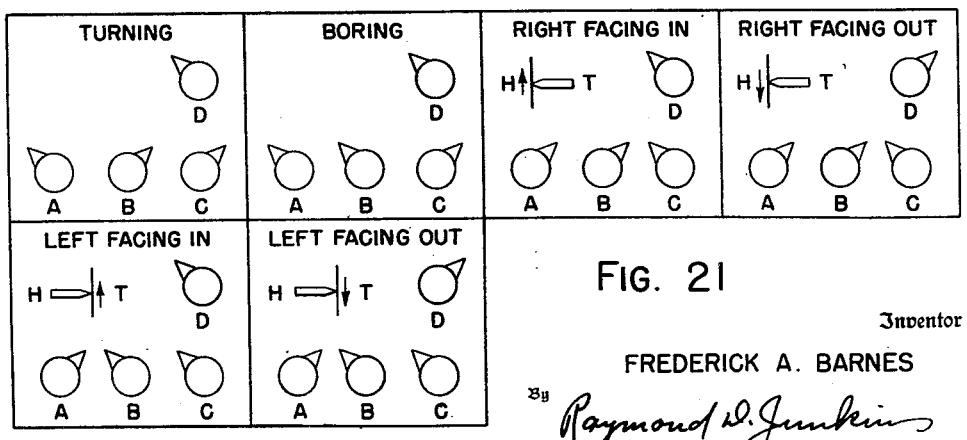
FIG. 20
FIG. 21
Inventor
FREDERICK A. BARNES
By Raymond D. Junkin
Attorney Patented Oct. 25, 1949

2,486,097

UNITED STATES PATENT OFFICE 2,486,097

CONTROL SYSTEM

Frederick A. Barnes, Cleveland Heights, Ohio, assignor to Bailey Meter Company, a corporation of Delaware Application March 2, 1944, Serial No. 524,705

7 Claims. (Cl. 90—62)

1

This invention relates to duplicators for controlling the operation of a material forming machine so that a work piece is formed to a contour or configuration determined by a template, pattern or cam.

One of the objects of my invention is to improve the sensitivity of contour control of the type described and to thereby increase the accuracy with which the work piece is formed.

A further object of my invention is to provide a contour control of materially simpler construction than those now available.

In accordance with my invention the template or cam for producing the desired configuration on the work piece is scanned by a tracer regulating a jet of fluid from a nozzle. Variations in the shape of the template cause corresponding changes in the fluid discharged from the nozzle which variations are then used to control the relative positioning of the tool and work piece.

Further, in accordance with my invention the changes in fluid pressure control the relative positioning of the tool and work piece through a hydraulic relay and servo-motor, to the end that ample power is available for accurately positioning the tool relative to the work piece, or vice versa. The relative rates of movement of the tool and work piece in two or more directions are simultaneously controlled so that the rate of cutting feed of the tool remains substantially constant regardless of changes in contour or profile of the template, pattern or cam.

Certain structures and apparatus disclosed herein are claimed as my invention. Other features and apparatus, disclosed but not claimed herein, are disclosed and claimed in the copending application Serial No. 524,707 of Clarence Johnson filed of even date herewith and having the same assignee, now Patent No. 2,475,326, granted July 5, 1949.

Obviously a duplicator or contour control of the type forming the subject matter of my invention may be employed with material forming machines or machine tools of various types, such as milling machines, lathes, slotters, planers, die sinking machines and other machines in which the relative feed between the tool and the work may be suitably controlled. By way of example I illustrate and will describe my invention as applied to metal working lathes and milling machines. Further applications and modifications of my invention will be readily apparent.

In the drawings:

Fig. 1 is a plan view of an engine lathe illustrating the application of my invention thereto.

2

Fig. 2 is a diagrammatic illustration of the pneumatic and hydraulic control circuits employed in the embodiment of my invention shown in Fig. 1.

Fig. 3 is a transfer valve arrangement of Fig. 2.

Fig. 4 is a sectional elevation of a tracer assembly.

Fig. 4A is a plan view of a portion of Fig. 4.

Fig. 5 is a sectional view taken in the direction of the arrows along the line 5—5 of Fig. 4.

Fig. 6 is an isometric view of a portion of the tracer assembly of Figs. 4 and 5.

Fig. 10 is a front elevation, partly in section, of a pilot valve assembly of Fig. 2.

Fig. 11 is an enlarged sectional elevation of the pilot valve of Fig. 10.

Fig. 12 is a sectional view of the stationary pilot valve sleeve of Fig. 11.

Fig. 13 is a front elevation, partly in section, of a fluid resistance assembly of Fig. 2.

Fig. 14 is an enlarged sectional elevation of the fluid resistance of Fig. 13.

Fig. 15 is an isometric view of the movable element of the fluid resistance of Fig. 14.

Fig. 16 is an isometric view of a modification of Fig. 15.

Fig. 17 is a sectional view in the direction of the arrows along the line 17—17 of Fig. 16.

Fig. 20 is a diagrammatic showing of the oil circuits of Fig. 2.

Fig. 21 is a diagram showing six possible combinations of valve control of the hydraulic system of Fig. 20.

Figure 8:
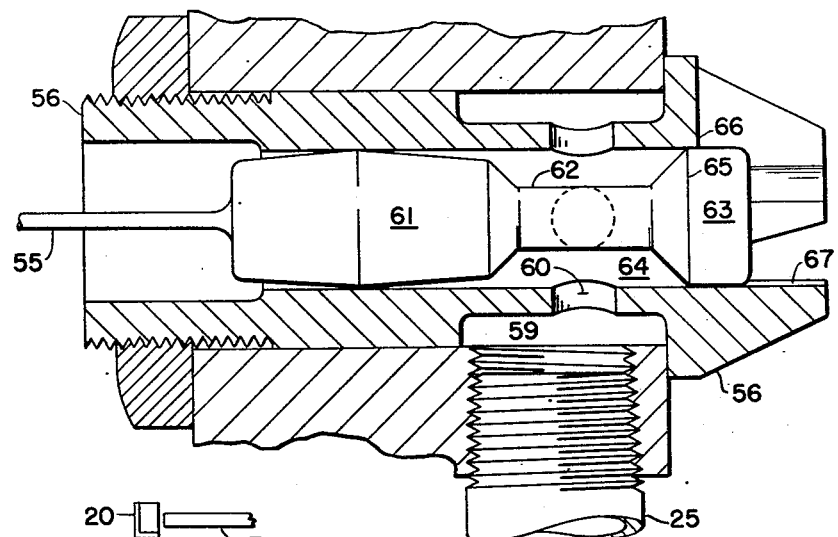
Fig. 8 is an enlarged sectional elevation of a part of Fig. 4, namely, of the air discharge valve.

As is well understood by those familiar with the art, in some machine tools such as lathes, the tool is moved longitudinally and transversely of the work piece which, except for rotation about its center, remains stationary. In other machine tools, such as some types of milling machines, the work piece may be moved in two directions, while the tool, except for rotation about its axis, remains stationary. In some other types of milling machines, and usually in die sinking machines, the tool may be moved in one or more directions and the work piece may also be moved in one or more directions. In all instances it will be observed, however, that it is the relative movement between the tool and work piece that causes the work piece to be formed to a desired shape. As one specific embodiment I have chosen to illustrate and describe my invention incorporated in a lathe wherein the work piece, except for rotation about its center, remains stationary and the tool is moved transversely and longitudinally thereof. As another specific embodiment of my invention I have illustrated my invention applied to a milling machine wherein the tool, except for rotation about its center, remains stationary and the work piece is moved in two directions in order that the tool may cut the work piece to a desired shape. It will thus be evident that my invention is applicable to a wide variety of machine tools, and that when I speak of relative movement between the tool and work piece I include either an arrangement where the tool is stationary and the work piece is moved, or where the work piece is stationary and the tool is moved, or a combination of the two.

Referring now to Fig. 1, I show my invention applied to an engine lathe 1 having a head stock 2 adapted to be rotated by any suitable means. The carriage 4 is movable longitudinally along the bed of the lathe in suitable ways 5 and supports the tail stock 3. Also movable longitudinally along the bed of the lathe in suitable ways 6 is a carriage 7 upon which is mounted a cross-slide 8 movable on ways transversely of the bed of the lathe.

The cross-slide 8 is provided with an adjustable tool support 9 in which is secured a tool 10. Transverse movements of the tool 10 are produced through the agency of a hydraulic cylinder 11 having a piston 12 adapted to position the cross-slide 8 through the agency of a piston rod 13. Longitudinal movements of the tool 10, that is movements of the tool parallel to the bed of the lathe in a longitudinal direction, are produced by means of a hydraulic cylinder 14 having an operating piston rod 15.

Supported by the head stock 2 and the tail stock 3 is a work piece 16 which, for illustrative purposes, is shown as being formed to a parabolic shape by the tool 10. This particular shape has no significance, it being apparent as the description proceeds that by my invention the work piece may be formed automatically to any desired contour. The master template or cam 17 is rigidly held in parallelism to the work piece 16 upon any convenient extension 18 of the lathe bed. The profile of the master template 17 is the contour which it is desired to reproduce upon the work piece 16. In Fig. 1 the shape of the work piece 16 follows in general a parabolic function merely as an example. For contacting and following the profile of the master template 17 I provide a tracer assembly 19 rigidly mounted on and movable with the cross-slide 8. The tracer assembly 19 is shown in larger and more detailed fashion in Figs. 4-9 inclusive as having a vertical extension 20 adapted to contact the front edge or profile of the master template 17. A body member or housing 21 is adjustably mounted to the cross-slide 8 and the tracer extension or arm 20 is carried with the body 21.

The tracer assembly 19 will be described in greater detail in connection with Figs. 4-9 inclusive. Suffice it to say now that the tracer arm 20 continually scans the profile of the template 17 and controls the bleed to atmosphere of a substantially constant pressure supply of compressed air. The variable bleed or rate of flow of air to the atmosphere produces corresponding changes in back pressure or pressure of the air effective to cause a positioning of the piston rods 13 and 15 for transverse and longitudinal movements respectively of the tool 10.

In Fig. 2 I have shown diagrammatically the pneumatic and hydraulic circuits for controlling the servo-motors 11 and 14 by the tracer 19 in such manner that the motor 11 will position the cross-slide and consequently the tool 10 transversely of the lathe, or in other words toward or away from the work piece 16 as the tool is travelling longitudinally. The action is such that if the contacted edge of the master template 17 is a straight line parallel to the axis of the work piece 16, then the work piece 16 would be turned to cylindrical form. If the contacted edge of the template 17 is a straight line, but inclined relative to the axis of the work piece 16, then the work piece 16 will be shaped to a taper. The particular showing of Fig. 1 is in general a parabolic curve on the contacted edge of the template 17, and thus the form which is to be produced on the work piece 16.

Air under pressure from any convenient source is passed through a pressure regulator 22 and volume chamber 23 to a header 24, from which a branch 25 leads through an orifice 26 to the tracer assembly 19. As the discharge from the tracer 19 to the atmosphere varies, the pressure in the branch 25 between the orifice 26 and the tracer assembly 19 will vary, and such controlled air pressure, representative of changes in contour of the template 17, is effective upon a bellows 27 of a pilot valve assembly 28 and simultaneously upon a bellows 29 of a fluid resistance assembly 30. The pilot valve assembly 28 and fluid resistance 30 will be explained more in detail in connection with Figs. 10-17 inclusive.

I show an oil pump 31 driven by a motor 32 and drawing its supply of oil from a sump 33. Oil under pressure is supplied the pilot valve 28 by the pump 31 through a pipe 34. From the pilot valve 28 oil is supplied to one end or the other of the hydraulic motor 11 through the pipes 35 or 36. Drainage from the pilot 28 is returned to the sump 33 through a pipe 37. In the pipe 36 I show a hand adjustable valve 38 for variably throttling the flow of oil therethrough and thus controlling the basic rate of travel of the piston rod 13. Within any preselected range of speed of piston travel the relay of the assembly 28 not only controls the direction of piston travel but the speed within said range.

In connection with the hydraulic motor 14 and adjustable fluid resistance assembly 30 I provide switching valves 39 and 40 arranged to be moved together to either a "normal" or a "rapid traverse" position of operation of the hydraulic motor 14. The valves 39 and 40 are shown in Fig. 2 in the "normal" operating position. Oil under pressure from the pump 31 is forced through a pipe 41, the valve 40 and a pipe 43 to one end of the hydraulic motor 14. Oil from the other end of the motor passes through a pipe 42, the valve 40, the valve 39, the pipe 44, the adjustable fluid resistance 30, and the pipe 45 to the sump 33. The regulation of the variable resistance 30 determines the rate of flow of oil through the pipe 42, and consequently the rate of travel of the piston rod 15 toward the left in the drawing. Thus the rate of longitudinal travel of the tool 10 along the work piece 16 is controlled by the variable resistance 30 to passage of oil therethrough from the left-hand end of the motor 14.

In Fig. 3 I show the passage relation of the switching valves 39, 40 for a "rapid return" of the piston rod 15 from left to right of Fig. 2. That is for a rapid return of the tool 10 to the beginning of its working travel. Oil from the pump 31 passes directly through the pipe 41, the valve 40, and the pipe 42; while oil from the right-hand end of the motor 14 passes directly through the pipe 43, the valve 40, the valve 39, to the pipe 45 and sump 33. Thus on the rapid return of the piston rod 15 there is no throttling of its speed of travel by the variable resistance 30, and thus the tool is traversed to the right at maximum speed.

In general, the operation of the system illustrated in Figs. 1, 2 and 3 is as follows. The air pressure established within the pipe 25 is such that the bellows 27 and 29 (and the movable parts of the assemblies 28, 30 positioned thereby) provide a normal condition of operation. The pilot valve assembly 28 locks oil from the pipes 35, 36 so that the piston rod 13 is not moving and the tool 10 travels a cutting path parallel to the axis of the work piece 16. At the same time the variable fluid resistance 30 is in a position to provide a normal speed of travel of the piston rod 15 from right to left on the drawing, thus moving the tool 10 along the work at a uniform normal speed.

If the profile of the template 17 recedes from the axis of the work piece, or advances toward the axis of the work piece, the air pressure within the pipe 25 is correspondingly varied in proper direction to increase or decrease the air pressure within the bellows 27 and 29 and to cause a corresponding positioning of the movable elements of the pilot valve 28 and fluid resistance 30. Such movement causes the hydraulic motor 11 to position the tool toward or away from the axis of the work piece 16, and thus reproduce upon the work piece 16 the contour of the master template 17. At the same time any departure (in either direction) of the movable element of the variable resistance 30 from normal position will increase the resistance to oil passage therethrough and tend to slow up travel of the piston rod 15. Thus longitudinal travel of the tool 10 from right to left on the drawing will be at a speed slower than the normal speed depending upon the rate of travel of the tool 10 toward or away from the axis of the work piece 16. If, for example, the profile of the template 17 includes a shoulder at right angles to parallelism with the axis of the work piece 16, then there will be a complete stoppage of longitudinal travel of the tool 10 while the tool is advancing directly toward the axis of the work piece or is receding directly therefrom. Movement of the tracer arm 20 either toward or away from the contact edge of the template 17 from a neutral or normal position results in a decrease in speed of travel of the tool 10 in a longitudinal direction from its normal speed of travel and irrespective as to whether the tool is advancing toward the axis of the work piece or is receding from the axis.

After complete travel of the tool has been accomplished from right to left, then a rapid return of the tool to the right may be accomplished by moving the switching valves 39, 40 to the position shown in Fig. 3 wherein the connections to the cylinder 14 are reversed and the variable restriction 30 is made non-effective.

The system which I have just described in connection with Figs. 1, 2 and 3 is in general a two-element control wherein the lathe tool is positioned both transversely and longitudinally of the work piece. It will, of course, be seen that either element may be employed without necessarily employing the second element. For example, a lathe or similar material forming machine may have the tracer assembly 19 control only the cross feed of the tool or only the longitudinal speed of the tool, or the two combined as I have just described. It may, however, in certain instances be desirable to include a third element, namely, a control of the speed of rotation of the work piece 16, so that the linear cutting speed of the tool will remain constant regardless of the diameter of the work piece at which the tool is cutting. In other words, so that the speed of rotation of the work piece 16 will be different when the tool 10 is cutting at a larger diameter than it is when the tool is cutting at a smaller diameter. To illustrate such a possibility I have indicated on Fig. 1 an oil motor 46 for rotating the work 16 and under the control of a tracer assembly 19A which may be mounted on and longitudinally moved with the carriage 7. On the cross-slide 8 I locate a cam surface 47 movable with the tool 10 and relative to the tracer arm 20A of the tracer assembly 19A so that the tracer arm 20A is deflected by the cam 47 an amount indicative of the transverse position of the tool 10 relative to the axis of the work piece 16.

As explained in connection with Fig. 2, the tracer assembly 19A may control a variable fluid restriction 30A in the supply line 48 leading from the pump 31 to the motor 46, or in the discharge line 49 between the motor 46 and the sump 33, so that the speed of the motor 46 will depend entirely upon the position of the tracer arm 20A relative to the assembly 19A, and consequently will depend upon the transverse location of the cutting tool 10. The tracer assembly 19A is connected to the air header 24 through a branch 50 and applies a regulated air pressure to the bellows 51 of the fluid restriction assembly 30A, such pressure bearing a definite relation to the transverse position of the tool 10 relative the axis of the work piece 16.

In other words, as the diameter at which the tool 10 is cutting increases or decreases, the speed of rotation of the work piece 16 will correspondingly decrease or increase respectively. It will be apparent that this third element of control may be included on the lathe of Figs. 1, 2 and 3, either alone or in combination with either or both of the two elements of transverse and longitudinal tool travel.

I will now describe in greater detail the tracer assembly 19 with reference to Figs. 4 to 9 inclusive.

Fig. 4 is a sectional elevation substantially to scale of a tracer assembly which I have found to be satisfactory and which includes certain features which I believe are novel and constitute invention. The body member or housing 21 may be made of cast iron for example and is provided with a machined surface, as at 52, for mounting on the cross-slide 8 by means of an appropriate clamp in any position of possible 360° rotation. Adjacent the upper edge of the machined surface 52 (on the housing 21) I provide an arrow or reference mark. On the clamping means which adjustably spans the surface 52 I provide properly designated reference marks so that the assembly 19 may be rotatably located in the clamping means to positions agreeing with the machining possibilities of Fig. 21 for example. When assembly 19 is properly located in its clamping means for any of the machining operations of Fig. 21 a failure of air supply pressure or a failure of bellows 27 or 29 causes the tool to back away from the work. As shown in Fig. 4, and the assembly of Fig. 1, the relatively sharp edge of the tracer arm 20 scans the edge of a relatively thin plate template 17. The tracer arm may assume any convenient cross sectional shape, as for example it may comprise a small diameter cylindrical rod. The entire assembly 19 of Fig. 4 may be rotated 180° on the surface 52 for boring operations or inside turning, for example.

Figure 7:
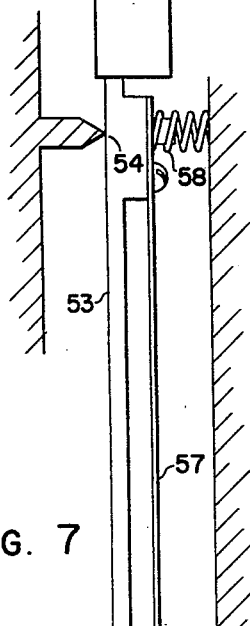
Fig. 7 is a somewhat diagrammatic representation of the tracer of Fig. 4.

For ease in understanding I have shown the tracer assembly quite diagrammatically in Fig. 7. Therein a rigid multiplying lever 53, pivoted as at 54, is moved by contact of the tracer arm 20 with the template 17 for positioning a valve member 55 relative to a fixed valve sleeve 56. The assembly including the lever 53, the tracer arm 20 and valve member 55 is held in longitudinal position by a leaf spring 57, which also biases the assembly 20—53—55 to the neutral position shown in the drawing, and loads the system against gravitational or vibrational angular movement about the pivot 54. A coiled spring 58 is provided for holding the lever 53 against the pivot 54. With such a construction the assembly 19 will function equally well in horizontal, vertical or inclined position.

Figure 9:
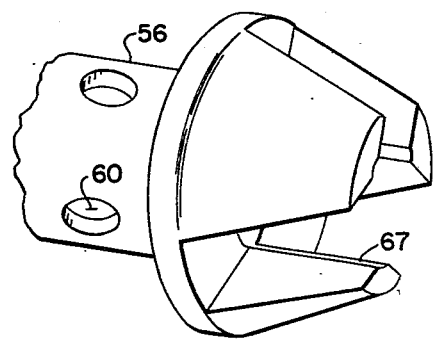
Fig. 9 is an isometric view of the stationary portion of the air valve of Fig. 8.

In Fig. 8 I show the air bleed valve assembly to approximately four times scale, and in Fig. 9 I show isometrically the discharge end of the stationary valve sleeve 56 to about eight times scale. Air at substantially constant pressure of 35 p. s. i. is available from the pipe 25 in an annulus 59 and through one or more openings 60 to the interior of the stationary sleeve 56.

The valve member 55 is provided with a sealing guide portion 61, a reduced diameter portion 62, and a valve portion 63. It is tapered .001 or more toward each end (as shown exaggerated in Fig. 8). With air under a pressure of approximately 35 p. s. i. in the annular chamber 64 surrounding the reduced portion 62 there will be a continual constant bleed of air to the atmosphere past the sealing portion 61 (toward the left on Fig. 8). Due to the shape of the portion 61 such bleed will center the portion 61 (and the complete valve assembly 55) in the bore of the sleeve 56 forming a lubricating film of flowing air of about .001 inch thickness surrounding the greatest diameter of the portion 61. The result is that the assembly 61—62—63 may be positioned axially of the sleeve 56 with substantially no friction or pressure reaction regardless of whether the assembly 61—62—63 is horizontal or vertical.

Under normal operating conditions, i. e. when the tracer arm 20 is scanning a straight portion of profile of template 17 parallel to the axis of work piece 16 the tracer arm 20 is deflected slightly toward the left (Fig. 4) and the movable valve assembly 55 is moved toward the right (Fig. 8) until the left-hand edge 65 of maximum diameter of the portion 63 has cleared the port end 66 of the sleeve 56 by .003 to .005 inch. Under this operating condition the portion 63 is guided by the three lands 67 (Fig. 9) and there exists a bleed to atmosphere of air from the chamber 64 through the clearance between circular edges 65 and 66 between the guide surfaces 67.

Under such operating conditions (with the work piece 16 being turned to cylindrical form) the pressure gage 68 will indicate a pressure of, for example, 35 p. s. i. minus approximately 3 p. s. i. per .001 inch deflection of the tracer arm 20 toward the left. The ratio of the lever 53 is approximately 3-1, so that a deflection of .001 inch of the tracer arm 20 to the left results in a movement of the valve assembly 55 of approximately .003 inch to the right, and thus a free bleed clearance between 65 and 66 of approximately .003 inch is obtained with a deflection of the tracer arm 20 to the left approximately .001 inch. In view of the definite relationship between deflection of the tracer arm 20 to the left, positioning of the valve assembly 55 to the right, and pressure within the pipe 25, the pressure gage 68 provides a convenient and accurate indication of tracer arm position relative the edge of template 17. The magnification of approximately 3 p. s. i. change in reading on the gage 68 for each .001 inch of tracer arm deflection provides an accurate check upon reproduction of position of the tracer arm relative the template and of bounce or over-travel upon radical change in contour of the template 17. Such magnified indication of tracer arm position and movement permits extreme sensitivity of adjustment.

Air pressure in the pipe 24—50 is held very constant (preferably at 44 p. s. i.), by means of pressure controllers 22 and volume chamber 23, as 1 p. s. i. here means about .00025 inch at the tracer arm 20. The orifices 26 are chosen to produce about a 9 p. s. i. pressure drop to 35 p. s. i. in the pipe 25 when the tracer is at neutral.

With the arrangement so far described there are three basic conditions of operation, viz.

1. For cylindrical turning where the profile of the template 17 is a straight line parallel to the axis of the work piece 16. Upon air pressure being available at the pipe 25, and correspondingly within the bellows 27 and 29, the piston 12 (Figs. 1 and 2) moves toward the top of the drawing carrying the tool 10 into engagement with the work piece and causes the tracer arm 20 to engage the edge of the template 17 and deflects toward the left until a clearance of approximately .003 inch exists between the cutoff lines 65, 66. This permits a predetermined bleed of air past the portion 63 to the atmosphere and a predetermined pressure of air imposed within the bellows 27 and 29. At this predetermined air pressure the pilot valve assembly 28 is so positioned as to lock oil in the pipes 35, 36 to opposite ends of the piston 12 and prevent the tool 10 from further advancing toward or receding from the axis of the work piece 16. At the same time the air pressure imposed upon the bellows 29 causes a predetermined normal flow of oil through the pipe 42, the valve 40, the valve 39, the pipe 44, the resistance 30 and the pipe 45 to the sump 33, resulting in a normal uniform rate of travel of the piston rod 15 from right to left, and correspondingly a normal uniform rate of travel of the tool 10 from right to left along the work piece 16. The result is a cylindrical turning of the work piece 16.

2. Assume that the profile of the template 17 recedes from parallelism with the axis of the work piece 16. The deflection toward the left of the tracer arm 20 is eased, the valve assembly 55 tends to move toward the left, the clearance between bleed edges 65, 66 decreases, and pressure within the pipe 25 tends to build up. Such increase in pressure effective upon the bellows 27 causes a flow of oil through the pipe 36 and a bleed of oil through the pipe 35, resulting in a movement of the piston rod 13 (upward in Fig. 1) such that the tracer arm 20 will tend to follow the receding profile of the template 17 and at the same time the tool 10 will move toward the axis of the work piece 16. If the recession of the template 17 is uniform, that is a straight line departing from the axis of the work piece 16, then the work piece will be formed to a taper of decreasing diameter toward the left. The increase in air pressure within the pipe 25 effective upon the bellows 29 causes the variable fluid resistance 30 to tend to throttle the discharge of oil from the left-hand end of the cylinder 14, and reduce the speed of longitudinal travel of the tool 10 toward the left.

3. If the profile of template 17 tends to approach the axis of the work piece 16 the reverse condition obtains, namely, that the tracer arm 20 tends to deflect in a greater degree toward the left, tending to increase the bleed past the bleed edges 65, 66, tending to decrease the air pressure within the pipe 25. Such decrease in air presssure effective upon the bellows 27 results in a movement of the piston rod 13 downward on the drawing (Fig. 1), resulting in the tool 10 producing an increasing diameter upon the work piece 16. At the same time the decrease in pressure within the pipe 25 effective upon the bellows 29 causes the variable fluid resistance 30 to throttle the discharge of oil from the left-hand end of cylinder 14, and thus reduce the longitudinal travel speed of the tool 10.

It will be observed that under condition 2 as well as under condition 3, namely, when the tool 10 is positioned either toward or away from the axis of the work piece 16, the rate of longitudinal travel of the tool is decreased. To carry this to an extreme, assume that the profile of the template 17 includes a shoulder normal with the axis of the work piece 16. Regardless of whether such shoulder is approaching or receding from the axis of the work piece, the longitudinal travel of the tool 10 will cease, while the tool is approaching or receding from the axis of the work piece along a line normal thereto. For all degrees of taper or inclination relative to the axis of the work piece, a corresponding rate of longitudinal travel of the tool is obtained. Thus in cutting a steep taper a different longitudinal speed is had than in cutting a slow taper.

In Fig. 4A I show a plan view of a portion of Fig. 4. As previously mentioned, the tracer assembly 19 may be rotated on its machined surface 52 in the means used to clamp it to the cross-slide 8. I have found that the plane of the flat spring 57 should lie at an angle of about 15° with the datum line of template 17 for best operation. In this position (as shown in Fig. 4A) the tracer arm 20, upon encountering a shoulder normal to the datum line, will not bind, but the force component is sufficient to vary the air bleed through 65—66.

In Fig. 4 I show that the end of the air bleed valve 55, 56 is loosely encased by a shield 69 forming a chamber to which the air bleeds under substantially uniform atmospheric condition without the possibility of adverse ambient effects. Most of the bled air sweeps upward through the housing 21 and out beneath the guard 71, thus preventing dust or machining chips from entering the assembly.

At the upper end of the beam 53 I show the tracer arm 20 mounted in a head piece 70 by means of one or more set screws providing a possibility of using different shapes of tracer arms or of angularly moving the same relative to the head 70. Fastened to and carried by the head 70 is a dirt deflector 71 allowing angular movement of the assembly relative the pivot 54 and discharge of air to the atmosphere.

The assembly at the lower end of Fig. 4 provides a wobble connection between a hand actuated rod 72 and the lever 53. A disc 73 is held against the lower end of the housing 21 by a spring 77, whose other end is positioned in a cup 79. The disc 73 has an angularly placed projection 74 engageable by a parallel projection 76 of an extension 75 to the lever 53. The disc 73 has a further U-shaped projection 78 to which an arm 80 is rigidly attached. Movement of the arm 80 in any direction tilts the disc 73 and causes an engagement between the projections 74 and 76 to the end that the extension 75 is moved toward the right (Fig. 4), which is equivalent to the tracer arm 20 being moved toward the left as by engagement with the template 17. Movement of the tracer arm 20 to the left causes an increased bleed past the edges 65, 66, resulting in a movement of the assembly 19 toward the left through the agency of the piston rod 15.

The rod 72 is normally extended along the cross slide 8 to a position at the face of the lathe where the operator can reach the same for hand actuation. When a traverse of the template 17 has been completed the operator pulls the rod 72 toward him (toward the left in Fig. 4) and this results in a movement of the cross slide 8, tool 10, and tracer assembly 19 away from the profile of the template 17 after which the switching valves 39, 40 may be actuated so that the tool, cross slide and tracer assembly are returned at relatively high speed toward the right for beginning another cutting travel.

In the constructional drawings, Figs. 4 and 5, and the isometric Fig. 6, I indicate that there are two knife edge pivots 54 straddling the assembly comprising the lever 53 and leaf spring 57. The latter are held together by a clamping block 81 carrying spacing screws 82 which just contact the outer edges of the two knife edges to prevent lateral motion of the assembly of lever 53 and leaf spring 57.

I will now describe, with reference to Figs. 10, 11 and 12, the oil relay valve assembly 28. In Fig. 10 I show an elevation, partly in section, of the complete assembly to approximately one-half scale. In Fig. 11 I show to approximately full scale a sectional elevation of the relay valve itself, and in Fig. 12 a sectional view of the pilot valve sleeve to still larger scale.

Air pressure, as determined by the tracer assembly 19, is available through the pipe 83 and effective upon the bellows 27 for positioning the free end 84 thereof as well as the movable containing cup 85. Positioned by the bellows 27 is a relay valve member 86 relative to a stationary sleeve member 87. Loading the bellows, or opposing movement of the bellows and the valve member 86, is a spring 88 adjustably supported at one end and pivotally fastened at its movable end, as at 89, to one end of a yoke 90 straddling the air inlet pipe 83 and bellows containing cup 85. At its lower end the yoke 90 is fastened to the bellows containing cup 85, and is also attached to the upper ball joint 91. The relay valve member 86 is positioned by a wire or small rod connection 92 joining the upper ball joint 91 with a lower ball joint 93, the latter of which is adjustably connected to the relay valve member 86.

Due to the design of the valve member 86, it is positionable with substantially no friction or end thrust reaction, and thus imposes substantially no load upon the positioning rod 92. The driving construction including the ball joints 91, 93 and rod 92 minimizes the effect of any slight misalignment of the parts or distorted movement of the power unit comprising the spring 88, the yoke 90, bellows 27 and the containing cup 85. The construction of the ball joints 91 and 93 is clearly shown in Fig. 11 wherein the ball retaining cap 94 may be of metal for example and may be lubricated. Obviously, the compression of the cap 94 upon the ball may be readily adjusted.

The movable valve member 86 is provided with three spaced lands 95, 96 and 97 and is positionable within the bore 98 of the stationary sleeve 87. In my preferred construction the upper and lower lands 95, 97 have a diameter allowing a total clearance of approximately .001 inch with the bore 98, while the middle land 96 may have slightly less clearance with the bore 98.

Oil under pressure from the pump 31 is available through the pipe 34 in an annular chamber 99 surrounding the sleeve 87 at the location of the land 96 and communicating with the bore 98 through a plurality (in this example four) of openings 100. The width of the land 96 is preferably about .002 inch less than the diameter of the holes 100 so that when the member 86 is in its neutral position, with the land 96 centered on the holes 100, there may be a very slight bleed of oil from the annular chamber 99 through the holes 100 to either side of the land 96 within the bore 98.

With the member 86 in neutral position the lands 95, 97 are so spaced relative to drainage openings 101, 102 that the tip of each such opening is uncovered by approximately .002 inch providing thereby a continuous small bleed of oil from the interior of the bore 98 between the lands 95, 96 and between the lands 96, 97. I have shown the sleeve 87 as having two drainage openings 101 and two drainage openings 102, each of roughly triangular shape. The number and shape of these openings may vary for different conditions. They communicate respectively with annular chambers 103, 104, which drain to the sump through pipe or pipes 37.

Intermediate the lands 95, 96 in the sleeve 87 are a plurality of openings 105 communicating with an annular chamber 106 to which is joined the pipe 36 leading to one end of the cylinder 11. Intermediate the lands 96, 97 in the sleeve 87 are a plurality of openings 107 communicating with an annular chamber 108, which is joined by the pipe 35 leading to the other end of the cylinder 11.

The operation is as follows:

1. With the valve member 86 in what I term a neutral position (for cylindrical turning) the piston 12 is locked by equal oil pressures on opposite sides thereof against movement. A minute constant flow of oil (from the supply pipe 34) passes through the chamber 99 and holes 100 to either side of the land 96 which is positioned centrally of the holes 100. At the same time an equal minute bleed of oil under pressure takes place through the discharge openings 101, 102 to the annular chambers 103, 104, and the pipes 37 to the sump. Thus the system comprising the supply pipe 34, the space within the bore 98 between the lands 95, 96, the space within the bore 98 between the lands 96, 97, pipes 35, 36 and the two ends of the cylinder 11 are all maintained under an active uniform fluid pressure with no possibility for pressure build-up at one side of the piston 12 relative to the other side, or vice versa. The adjustment of the assembly 28 including the loading spring 88 is such that in the "neutral position" of the valve parts 86 are not precisely centered axially of sleeve 87 but are minutely off center sufficiently to compensate for the unequal piston areas of piston 12 in hydraulic motor 11 created by the total pressure on one side thereof over the slightly reduced pressure area on the other side due to the cross-sectional area of the piston rod. Thus, the unequal piston areas are opposed by unequal fluid pressures sufficient to produce a balanced condition and lock the piston 12 against movement and consequently cylindrical turning may be accomplished when the relay ports are in what is termed "neutral position." I have found it highly desirable to provide (at neutral position of the valve member 86) such continuous minute passage of oil from the supply 34 through the pilot assembly to drain 37 to insure full equalization of pressure in all parts of the system.

2. When, upon change in pressure effective upon the bellows 27, the relay member 86 is moved upwardly, the land 96 closes off completely the openings 100 from the openings 105, and the land 95 further opens the drainage holes 101 to allow a bleed of fluid from the pipe 36 to the drain 37. At the same time the land 96 increases the opening through the holes 100 to the openings 107 to allow a greater intake of pressure fluid from the chamber 99 through the openings 107 to the chamber 108 and pipe 35. In the meantime the land 97 has completely closed off drainage to the lower discharge opening 102. The degree of upward movement of the valve 86 determines the percentage opening of the holes and thus the speed of travel of the piston 12.

3. Conversely, upon the valve 86 being moved downwardly, connections to the drain openings 101 are closed, the drains 102 are opened and fluid under pressure from the supply 34 is admitted to the pipe 36 and drained to the pipe 37 from the pipe 35.

Axial location of the sleeve 87 relative to the pipes 34, 35 and 36 is readily apparent from the drawing Fig. 11. Axial adjustment of the valve member 86 relative to the sleeve 87 for any given loading condition of pressure within the bellows 27 and loading of the spring 88 is accomplished by the adjustable connection to the ball joint 91 or 93.

The adjustable fluid resistance assembly 30 is illustrated in greater detail in Figs. 13–17 inclusive. Therein I have indicated by the same numerals those parts which are similar in the relay 28. The assembly 30 of Fig. 13 is shown as approximately one-half scale whereas Fig. 14 is approximately full scale, while Figs. 15, 16 and 17 are to further enlarged scale.

The adjustable fluid resistance comprises a movable member 110 positionable relative to a stationary sleeve 111. The two are confined in a fixed housing 112 joined by inlet pipe 44 and outlet pipe 45. Member 110 is provided with spaced lands 113, 114 having pressure equalizing grooves. In neutral position (as shown in Fig. 14) the lands are so spaced and located relative to access to the pipes 44, 45 that what may be considered a normal flow of oil exists from the pipe 44 to the pipe 45. The power system, including the spring 88 and bellows 29 may be so adjusted that the member 110 will be in its normal position for a given air loading pressure effective upon the bellows 29 which will be the neutral pressure for the relay valve Fig. 10. Any departure of such air pressure, either an increase or a decrease, resulting in movement of the member 110 upwardly or downwardly relative to the sleeve 111, will cause a decrease in rate of oil passage from the pipe 44 to the pipe 45. Thus any variation in air loading pressure upon the bellows 29 will result in a slowing down of the travel of the piston rod 15 from right to left as compared to its normal speed of travel. This is the same thing as saying that the longitudinal travel of the tool 10 will be decreased in speed upon any movement of the tracer arm 20 from neutral or normal position corresponding to a normal air pressure in the pipes 83 and 109.

In order that the value of what I term a normal rate of passage of oil from pipe 44 to pipe 45 may be basically changed, I provide means for angularly moving the member 110 to thereby increase or decrease the opening to oil flow between the pipes 44 and 45 when the member 110 is axially in its normal position. Such means includes a local or remote handle 115 adapted to cause rotation of spur gears 116, 117, the latter being loosely journaled on the body or fixed housing 112. Carried with the gear 117 is an arm 118 having a driving post 119. Angular movement of the driving post 119 around the axis of the assembly angularly positions the member 110 and ball joint 93 through the agency of a leaf spring 120. The construction is such that the member 110 and leaf spring 120 may be moved axially without appreciable loading by the leaf spring.

Referring now to Fig. 15, it will be observed that the member 110 has a flatted portion 121 joining the lands 113, 114. Preferably the width of the rectangular cross-section portion 121 is less than the diameter of the lands 113, 114. Said lands 113, 114 are beveled toward the flatted portion 121 so that as the member 110 (in normal axial location) is angularly moved around its axis through the agency of the handle 115, a different portion of the bevel is presented opposite the exit from the pipe 44 and opposite the entrance to pipe 45. Thus in a given angular position of the member 110 any vertical positioning of the member is over a different range of fluid flow rate than for some other angular position.

In Figs. 16 and 17 I show a further preferred construction of the member 110 wherein that portion 122 joining the lands 113A, 114A is cylindrical and of a slightly less diameter than the diameter of the lands. At the facing ends of lands 113A, 114A the step constituting the difference in diameter between the portion 122 and diameter of the lands is formed as a spiral over 180° of the circumference. As indicated in Fig. 17 this double spiral end of each land is milled to the depth of the diameter of the portion 122. With this preferred construction a more graded or gradual adjustment of the range of fluid passage in accordance with angular rotation of the member 110 is obtained. It will be apparent that the member 110 may assume other shapes to allow a greater or lesser latitude in adjustability of the range of fluid throttling, and thereby the range in speed of the piston rod 15.

Figure 18:
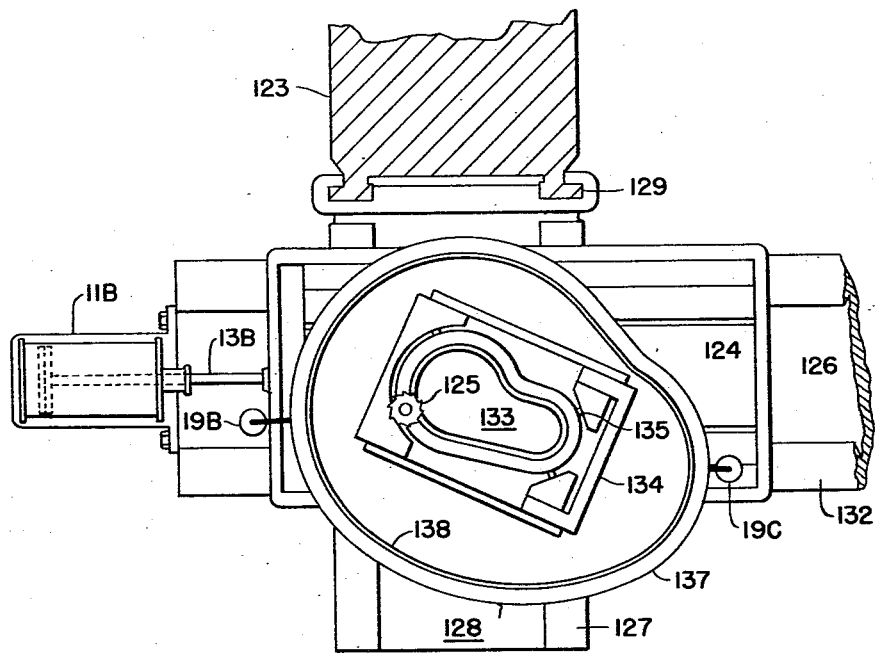
Fig. 18 is a plan view of a portion of a vertical milling machine to which my invention has been applied.

Referring now to Fig. 18 I therein show a view looking down on a vertical milling machine having a column 123, a work table 124, and a rotatable form milling cutter 125. The work table 124 is carried on a saddle 126 mounted on horizontal guideways 127 carried by a knee 128, which is movable on vertical guideways 129 formed on the column 123. The cutter 125, while rotating, is normally in fixed axial position. The work table 124 carries a support 130 for a rotatable work mounting 131. The work table 124, the support 130, and the work mounting 131 are movable horizontally along the guideways 132 of the saddle 126.

At 133 I show a typical work piece consisting of a concave forging of more or less cylindrical shape and in rough form having a raised blank face extending around its entire periphery. The machining operation which I have chosen as illustrating my invention includes forming a male flange on this flange face. The cutter 125 is suitably shaped to relieve the outer edge of the flange, and by my invention the work piece is automatically moved along the guideways 132 relative to the cutter 125 so that the latter accurately forms the outer profile of the raised portion of the flange.

The work piece 133 is shown as being secured to a fixture 134 by adjustable clamping means 135. Because of the nature of the machining operation to be performed the fixture 134 is secured to the work mounting 131 and rotatable at desired speed by a hydraulic motor 136 similar to the motor 46 of Fig. 1 and controlled in a manner described in connection therewith. In other words, the rotation of the work mounting 131 and work piece 133 may be at a variable speed dependent upon the particular shape of the contour to be produced. Machining of the work piece 133 is completed in one revolution of the work mounting 131; during the revolution of the work piece 133 being moved transversely relative to the cutter 125 to accurately profile the male flange by means now to be described.

The fixture 134 has a horizontally extending skirt 137 forming a cam or template, the contour of which is formed to produce the desired contour of the raised portion of the flange on the work piece 133. A raised barrier 138 is preferably employed to hold chips out of the work piece from scattering. Supported by the saddle 126 is the tracer assembly 19B having its tracer arm 20B engaging the periphery of the cam 137. The device 19B controls the hydraulic motor 11B driving the piston rod 13B for horizontally positioning the rotating work mounting 131 along the guideways 132 on the saddle 126. Through engagement of the tracer arm 20B with the periphery of the cam 137 the motor 11B is activated to position the work table 124 carrying the work 133 and cam 138 to the right or left along the ways 132 relative to the axially stationary but rotating milling cutter 125.

Figure 19:
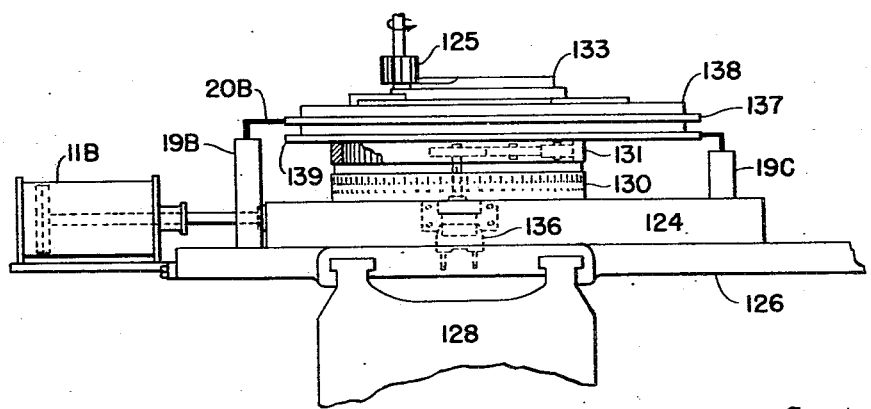
Fig. 19 is a front elevation of Fig. 18.

In Fig. 19 I show an elevation of a portion of the milling machine of Fig. 18. I provide a second cam or template 139 rotatable with the work mounting 131, the work 133 and the cam 137. Engaging the periphery of the cam 139 is the contact arm of a tracer 19C mounted on the work table 124. The tracer assembly 19C is, however, movable along the ways 132 of the saddle 126 with both the rotatable and the non-rotatable portions of the work table assembly.

The motor 136 for rotating the work mounting 131 is movable along the ways 132 with the work table 124. This motor is controlled by the tracer 19C in engagement with the cam 139 and functions to provide a speed of rotation of the work piece 133 dependent upon the profile of the cam 138. In general, the arrangement is such that the cam 137 provides for transverse movement of the work 133 relative to the cutter 125, and while the work 133 is making one complete revolution. The cam 139 functions to determine the speed of rotation of the work piece 133 relative to the cutter 125 during the single revolution of the work piece. The hydraulic motors 11B and 136, under the control of the tracer assemblies 19B and 19C respectively, may be of the type described and controlled as previously mentioned. In other words, the hydraulic motor 11B is adapted to position the work table assembly back and forth relative to the cutter 125 and at a variable speed. The motor 136 rotates the work 133 always in one direction but at a speed dependent upon the contour of the cam 139.

In Fig. 20 I illustrate the oil circuits of Fig. 2 in more commercial arrangement. Preferably the operator has available, as he faces the tool and work piece of a lathe, a pair of speed controls and a pair of shiftable levers for making effective the transverse and longitudinal servomotors. Speed control L corresponds to the adjustment 115 (Fig. 13) for varying the basic speed range of the longitudinal tool travel. Speed control T corresponds to valve 38 (Fig. 2) placing an adjustable resistance in the oil line to one end or the other of the transverse cylinder 11. Thus the operator may readily adjust the speed range within which the tool travels either transversely or longitudinally of the work and within which speed range the actual speed is determined by the shape of the template 17. The lever 140 for selective control of the longitudinal travel of the tool provides a normal operating position of the valves 39, 40 (Figs. 2 and 3), a neutral or shutoff position, and a rapid return of the tool to the starting point of its cut. The lever 141, for selective control of the transverse travel of the tool provides, in connection with the adjustable resistance 38, a normal operating transverse speed of the tool, a neutral or shutoff position where the tool is locked against transverse travel, and a position wherein the resistance 38 is by-passed and the tool is movable either toward or away from the work at a maximum speed.

Preferably located at the rear of the lathe near the oil pump and sump I provide hand actuated transfer valves A, B, C and D. Fig. 21 illustrates six possible operating conditions of the system obtained by valving the oil pipes. For example, the valves A, B, C and D are shown in the same position in Fig. 20 as in the "turning" position of Fig. 21. With this valving arrangement a normal outside turning operation may be performed on the lathe with the tool traveling from right to left for example. By proper manipulation of the valves A, B, C and D (as shown in Fig. 21) various "boring" and "face-plate" operations may be accomplished.

While I have illustrated and described certain preferred embodiments of my invention it will be understood that they are by way of example only and that I am not to be limited thereto except as defined in the following claims.

What I claim as new, and desire to secure by Letters Patent of the United States, is:

1. In a control system having a pattern guide, an improved tracer mechanism for the control system, comprising an air discharge device including a discharge means and actuating means, said discharge means having a sleeve portion and a valve portion movable relative to one another to variably discharge air from an air supply line to atmosphere, said actuating means comprising an elongated lever having a first end and a second end, pivot means to pivotally mount said lever at a point intermediate said first and second end, so that said first end of the lever pivots about a point on said lever, resilient means for supporting said lever at a point remote from said pivot means and for opposing movement of said lever from a predetermined position, means to drivingly interconnect said second end of the lever to one of said portions of the discharge means, said first end of the lever being adapted to contact said pattern, means to move said tracer mechanism relative to said pattern guide, whereby variable contact of the first end of the lever and the pattern will pivot said lever and thereby actuate said discharge means to vary the discharge of air therefrom to atmosphere.

2. In a control system including a source of substantially constant air pressure, a guide pattern, tracer means to scan said pattern and variably discharge air from said constant source of pressure to thereby produce a variable air pressure between said source and tracer means, and pressure responsive control means operably controlled by the variations of air pressure, the improvement of said tracer means for said system, comprising a tracer body member, a sleeve member carried by said body member, a valve member movable in said sleeve member to variably discharge air from said air source, and actuating means including an actuating lever having a first end extending from said tracer body member and adapted to scan said pattern, a second end adapted to actuate said movable valve member, pivot means carried by said tracer body member and adapted to fulcrum said lever at a point relatively closer to said first end of said actuating lever, resilient means carried by said tracer body member at a point directly opposite said pivot means and adapted to press said actuating lever into supporting contact with said pivot means, and a leaf spring having a first end attached to said lever adjacent the fulcrum point between the fulcrum point and said second end of the lever, said leaf spring having a second end attached to said tracer body member at a point removed from said fulcrum point, said leaf spring serving to urge said lever and said valve member to a predetermined position relative to said tracer body and to return said lever and valve to said predetermined position after actuation away therefrom, whereby the tracer body member may be carried along said pattern and produce variable contact between the first end of the lever member and the pattern and thereby actuate said valve relative to said sleeve to vary the discharge of air therefrom to atmosphere.

3. In a control system having a pattern guide, an improved tracer mechanism for the control system, comprising an air discharge device including a discharge means and actuating means, said discharge means having a sleeve portion and a valve portion movable relative to one another to variably discharge air from an air supply line to atmosphere, said actuating means comprising an elongated lever having a first end and a second end, pivot means to pivotally mount said lever at a point intermediate said first and second ends so that said first end of the lever pivots about a point on said lever, constraining means adapted to both support said lever and to bias said lever to a predetermined position, means to drivingly interconnect said second end of the lever to one of said portions of the discharge means, said first end of the lever being adapted to contact said pattern, means to move said tracer mechanism relative to said pattern guide, whereby variable contacts of the first end of the lever and the pattern will pivot said lever and thereby actuate said discharge means to vary the discharge of air therefrom to atmosphere.

4. An improved tracer mechanism, comprising an air discharge device including a discharge means and actuating means, said discharge means having a sleeve portion and a valve portion movable relative to one another to variably discharge air from an air supply line to amosphere, said valve portion having a valve guide member adapted to fit said sleeve with clearance therebetween to permit air to flow constantly therebetween and escape to atmosphere to provide an air cushion for said valve portion, said actuating means comprising an elongated lever having a first end and a second end, means to pivotally mount said lever at a point intermediate said first and second ends, constraining means adapted to bias said lever to a predetermined position, means to drivingly interconnect said second end of the lever to one of said portions of the discharge means, extension means on said second end of the lever, actuation means adapted to be universally positioned relative to said extension means, and means co-acting between said extension and said actuation means adapted to pivot said lever from said predetermined position upon any movement of the actuation means.

5. A tracer comprising, a tracer body member, an actuating lever having a first end and carried by said tracer body member, said lever and said tracer body member adapted to have relative movement therebetween, a second end on said lever adapted to produce a control effect upon said relative movement, pivot means co-operating between said tracer body member and said lever at a fulcrum point, resilient means acting between said tracer body member and said lever at a point substantially in alignment with said fulcrum point and adapted to press said fulcrum point into supporting contact with said pivot means, and a spring means having a first end adapted to carry said lever adjacent the fulcrum point, said spring means having a second end adapted to be carried by said tracer body member at a point removed from said fulcrum point, said spring means serving to relatively urge said lever and said tracer body member to a predetermined relative position and to relatively return said lever and said tracer body member to said predetermined relative position after actuation away therefrom.

6. A tracer comprising, a tracer body member, an actuating lever having a first end extending from said tracer body member and adapted to be movable relative to said body member, a second end on said lever adapted to produce a control effect upon said relative movement, pivot means cooperating between said tracer body member and said lever at a fulcrum point relatively closer to said first end of said actuating lever, resilient means acting between said tracer body member and said lever at a point substantially in alignment with said fulcrum point and adapted to press said fulcrum point into supporting contact with said pivot means, and a leaf spring having a first end attached to said lever adjacent the fulcrum point, said leaf spring having a second end attached to said tracer body member at a point removed from said fulcrum point, said leaf spring serving to relatively urge said lever and said tracer body member to a predetermined relative position and to relatively return said lever and said tracer body member to said predetermined relative position after actuation away therefrom.

7. A tracer for cooperating with a pattern to actuate control means comprising, a tracer body member, an actuating lever having a first end extending from said tracer body member and adapted to scan said pattern, a second end on said lever adapted to actuate said control means, pivot means carried by said tracer body member and adapted to fulcrum said lever at a point relatively closer to said first end of said actuating lever, resilient means carried by said tracer body member at a point directly opposite said pivot means and adapted to press said actuating lever into supporting contact with said pivot means, and a leaf spring having a first end attached to said lever adjacent the fulcrum point between the fulcrum point and said second end of the lever, said leaf spring having a second end attached to said tracer body member at a point removed from said fulcrum point, said leaf spring serving to urge said lever to a predetermined position relative to said tracer body member and to return said lever to said predetermined position after actuation away therefrom.

FREDERICK A. BARNES.

REFERENCES CITED

The following references are of record in the file of this patent:

UNITED STATES PATENTS

| Number | Name | Date |
|---|---|---|
| 1,754,046 | Rafferty | Apr. 8, 1930 |
| 1,959,178 | Sassen | May 15, 1934 |
| 2,025,748 | Howe | Dec. 31, 1935 |
| 2,079,720 | Shaw | May 11, 1937 |
| 2,113,943 | Kimball | Apr. 12, 1938 |
| 2,137,204 | Booth | Nov. 15, 1938 |
| 2,239,625 | Roehm | Apr. 22, 1941 |
| 2,250,241 | Thalmann | July 22, 1941 |
| 2,259,472 | Johnson | Oct. 21, 1941 |
| 2,277,075 | Dahl | Mar. 24, 1942 |
| 2,302,506 | Richards | Nov. 17, 1942 |
| 2,331,443 | Von Zelewsky | Oct. 12, 1943 |
| 2,331,817 | Turchan | Oct. 12, 1943 |
| 2,397,108 | Hanna | Mar. 26, 1946 |
| 2,436,373 | Barnes | Feb. 24, 1948 |

FOREIGN PATENTS

| Number | Country | Date |
|---|---|---|
| 25,939 | Great Britain | Nov. 25, 1902 |
| 847,882 | France | July 10, 1939 |